United States Patent [19]

Lumelsky et al.

[11] Patent Number: 5,261,049
[45] Date of Patent: Nov. 9, 1993

[54] VIDEO RAM ARCHITECTURE INCORPORATING HARDWARE DECOMPRESSION

[75] Inventors: Leon Lumelsky, Stamford, Conn.; Sung M. Choi, White Plains, N.Y.

[73] Assignee: International Business Machines Corporation, Armonk, N.Y.

[21] Appl. No.: 733,906

[22] Filed: Jul. 22, 1991

[51] Int. Cl.$^5$ .............................................. G06F 15/20
[52] U.S. Cl. ................................. 395/164; 395/166; 395/162; 365/189.01; 365/189.12; 345/191; 345/186
[58] Field of Search ............... 395/164, 166, 131, 162; 340/798, 799, 750, 703; 365/189.12, 189.05, 230.03, 240, 189.01; 358/426

[56] References Cited

U.S. PATENT DOCUMENTS

| | | | |
|---|---|---|---|
| 4,410,965 | 10/1983 | Moore | 365/230.06 |
| 4,492,983 | 1/1985 | Yoshida et al. | 358/426 |
| 4,554,638 | 11/1985 | Iida | 395/166 |
| 4,626,929 | 12/1986 | Ichinoi et al. | 358/310 |
| 4,683,555 | 7/1987 | Pinkham | 340/799 |
| 4,684,942 | 8/1987 | Nishi et al. | 340/703 |
| 4,698,788 | 10/1987 | Flannagan et al. | 365/205 |
| 4,764,866 | 8/1988 | Downey | 364/200 |
| 4,808,986 | 2/1989 | Mansfield et al. | 340/799 |
| 4,920,504 | 4/1990 | Sawada et al. | 395/166 |
| 4,951,258 | 8/1990 | Uehara | 365/222 |
| 4,985,871 | 1/1991 | Catlin | 365/230.06 |
| 5,056,041 | 10/1991 | Guttag et al. | 395/164 |
| 5,148,523 | 9/1992 | Harlin et al. | 395/164 |

Primary Examiner—Dale M. Shaw
Assistant Examiner—Kee M. Tung
Attorney, Agent, or Firm—Perman & Green

[57] ABSTRACT

An image buffer semiconductor chip is described that includes circuitry for decompressing, compressed pixel image data such data comprising at least a pair of color codes and a bit mask including bit positions with values that define which pixels in a pixel subset of the pixel image receive the encoded color code data. The chip comprises a matrix of memory modules with the pixels in a pixel subset stored in an interleaved fashion, one pixel per module. A data bus communicates with all of the memory modules and broadcasts the color codes. A mask register stores the bit mask when it appears on the data bus. Circuitry selectively writes a first color code in the modules in accordance with bit values of a first kind in the MASK and writes the second color code into the modules in accordance with bit values of a second kind in the MASK.

11 Claims, 4 Drawing Sheets

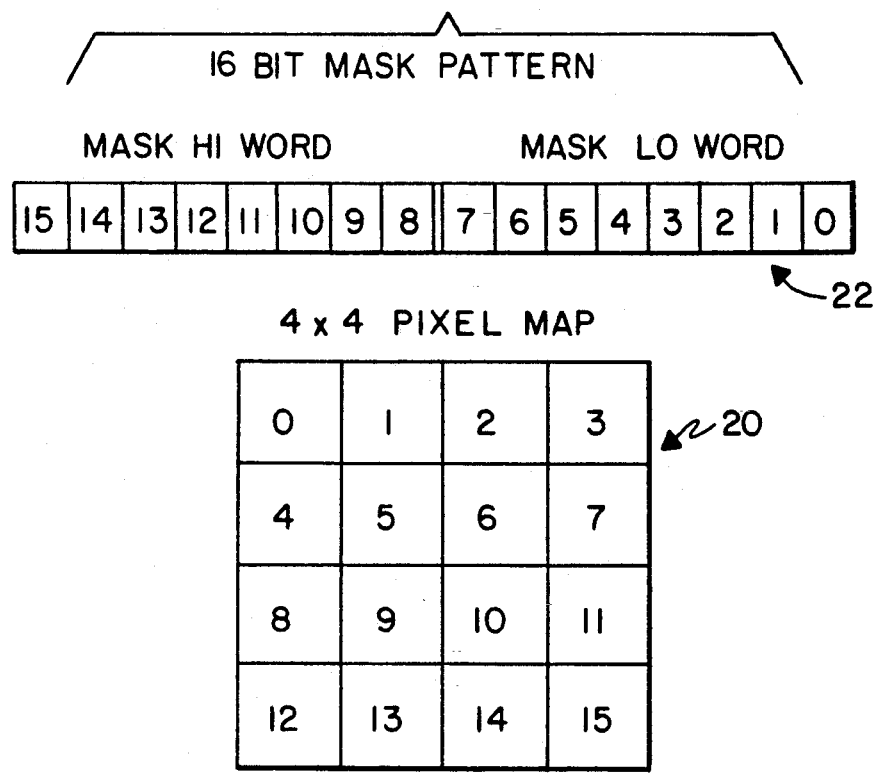

VIDEO RAM ARCHITECTURE INCORPORATING HARDWARE DECOMPRESSION

FIELD OF THE INVENTION

This invention relates to high performance display systems, and more particularly, to a VRAM frame buffer wherein image decompression is accomplished in real time.

BACKGROUND OF THE INVENTION

With the growth of memory densities, it is becoming more evident that the number of input/output (I/O) pins is a significant limiting factor. This is illustrated by examining the growth of video random access memories (VRAMs) from 1 Mbit per chip to 4 Mbits per chip. A typical 1 Mbit VRAM uses a 28 pin package. However, a proposed standard for a 4 Mbit VRAM employs a 64 pin package, an increase of 36 pins. Not only does this require a larger physical size for the memory chip, but it also creates problems for higher density memory chips, they are developed.

Previously, one major advantage that accrued from the use of high density memory chips, was that the reduced memory chip size provided more board space. However, when the board space required for four, 1 Mbit VRAMs is compared to one 4 Mbit VRAM, the total required board space is approximately the same. Furthermore, with the ongoing development of memory chip technology, 16 Mbit memory chips are in sight followed by 64 Mbit memory chips. If the trend continues of increasing I/O pins with memory chip size, then a 16 Mbit VRAM will require 128 pins just for data ports (64 for random I/O ports and 64 for serial I/O ports). The problem of increasing I/O pin requirements is even more evident when one considers a 64 Mbit memory chip where 512 data pins will be required.

One solution to the problem is to limit the number of data pins, and increase the number of row and column memory modules. For example, since a 4 Mbit VRAM is configured as $512 \times 512 \times 16$, a 16 Mbit VRAM may be configured as $1024 \times 1024 \times 16$, not as $512 \times 512 \times 64$. If this method is used, then the I/O pin count will remain approximately the same, however, the provision of a larger memory cell array within a memory chip inherently lessens the interleavability of the system design.

Consider a frame buffer system which has $1024 \times 1024$ resolution with 16 bits per pixel. Such a buffer requires either four, 4 Mbit VRAMs ($512 \times 512 \times 16$) or one 16 Mbit VRAM ($1024 \times 1024 \times 16$). The maximum throughput of the frame buffer is limited to the Fast Page Mode access bandwidth of one VRAM. If the frame buffer design is implemented using 4 Mbit VRAMs, then 4 such VRAMs are required but can be 4-way interleaved for added performance. Assuming that a local workstation can keep up with the frame buffer throughput, the maximum performance of such a frame buffer is four times the performance of each VRAM (since 4 VRAMs can be accessed simultaneously). If Fast Page Mode cycle timing is the same for both 16 Mbit and 4 Mbit VRAMs, then a frame buffer implemented with the smaller VRAMs has a higher performance capability than one implemented with the larger VRAM.

The serial output port of the VRAM also has a similar problem. If a single 16 Mbit VRAM is used for a $1024 \times 1024 \times 16$ frame buffer, then its serial output throughput must be at least as great as that of the video bandwidth for the monitor of that resolution. However, typical VRAMs currently exhibit a serial bandwidth of approximately 33 Mhz. A 60 Hz, $1024 \times 1024$ resolution monitor requires at least a 60 Mhz video data rate. It is therefore evident that the serial output performance of a high performance VRAM must be improved.

One solution to the serial output bandwidth constraint is to parallel the serial outputs on a VRAM. This however increases the number of I/O pins on the memory chip and is to be avoided if possible.

Image data compression/decompression has been employed to improve the performance of VRAM image buffers. An advantage of using compression and decompression of images is that the storage required to record the images at the source is reduced. In addition, the bandwidth required to transfer the images is reduced.

A favored compression algorithm is a block truncation method that is described in detail by Healy et al. in "Digital Video Bandwidth Compression Using Truncation Coding", IEEE Trans. Comm., COM-9, Dec. 1981, pp. 1809-1823. It provides high quality text and graphic image decompression and reasonable quality, television-like natural images. The compression method per se is not directly relevant to this invention and only certain aspects of it will be reviewed.

The basic idea of the algorithm is to represent each 4 by 4 region of pixels (48 bytes, assuming 3 bytes per pixel) by two colors (3 bytes each) plus a 16-bit wide MASK. The two colors are calculated statistically to best represent the distribution of colors in the $4 \times 4$ pixel region. The two colors are called HI color and LO color. Each mask bit determines whether the corresponding pixel should get either a HI or LO color. When the MASK is '1', then the corresponding pixel gets the HI color; and when it is '0', then the corresponding pixel gets the LO color. This is illustrated in FIG. 1, which shows the bit mapping of a $4 \times 4$ pixel region 20 to its MASK 22. Since $4 \times 4$ pixels can be represented by using HI and LO colors (3 bytes each) and a 16 bit MASK (2 bytes), the compression ratio is $R_{cmp} = 48/(3+3+2) = 6$.

The decompression mechanism is simpler than that of compression. For each $4 \times 4$ pixel matrix, a destination device receives two colors (HI and LO) and the 16 bit MASK. For each bit of the MASK, the corresponding pixel in the $4 \times 4$ pixel matrix gets either the HI color, if the MASK bit is '1', or the LO color if the MASK bit is '0'. FIG. 2 shows the compressed data format of an arbitrary $4 \times 4$ pixel area 24, where each pixel is either one of the two colors, A or B.

In a typical system, data received over the network is temporarily buffered into a FIFO store (first-in, first-out) until it is ready to be stored in a VRAM frame buffer. Such VRAM's are operated in the Fast Page Mode where a memory cycle is typically 50 nS.

It is known that decompression can be performed by storing the compressed data format into a frame buffer and then decompressing the pixel data at the time of video refresh. Another method is to decompress an image prior to storing it into the frame buffer. Although the first method requires less frame buffer memory than the second, it presents problems because the compressed pixel data format cannot easily be used for data manipulation and almost any such operation requires the pixel data to be decompressed first. Also, if the frame buffer stores only a compressed data format, then another frame buffer is needed to store uncompressed images. The solution is to decompress the data prior to storing it into the frame buffer, such that the frame buffer contains only a R, G, B pixel format.

There are a number of problems associated with decompression. The first is that the decompression must be done in real-time in order for the frame buffer not to be the bottleneck in the system. For example, since the MICRO CHANNEL BUS used by IBM PS/2 is capable of transferring 32 bits of data every 100 nS, (thus 16 pixels of information every 200 nS), the frame buffer requires a minimum bandwidth of 80 million pixels/second (16/200 nS) in order for the frame buffer not to be a bottleneck in the system.

A classical solution that improves a memory's bandwidth is to interleave the memory. There are two ways to interleave a memory. One is to access the interleaved memory in parallel such that, in one memory access time, there will be N operations for an N way interleaved memory. The second is to access interleaved memory in a time-serial overlapped manner, such that another memory access to a different module can be started 1/N memory cycle period later for an N-way interleaved memory. In either case, the frame buffer should be designed such that the decompression bandwidth is greater than or equal to the communication network bandwidth so that the frame buffer is not the bottleneck of the system. In order to maximize the bandwidth, each memory module should have an independent data path and separate controls such that all modules can operate in parallel. Notice that as described before, in case of a MICRO CHANNEL BUS, 16 pixels of information can be transferred every 200 nS (16 pixels/200 nS=80 million pixels/second). If 50 nS bandwidth memory chips are used within the memory modules, then N must be at least 4 (4 pixels/50 nS=80 million pixels/second). If N is 16, then a maximum bandwidth of 320 million pixels per second can be achieved (16 pixels/50 nS). Although simple memory interleaving gives the best performance, it does not justify the complexity and cost of having multiple memory modules, each with its own separate data path and controls.

The second problem is that the VRAM must allow non-compression mode access. Non-compressed mode access is also important since compression/decompression is lossy. It is possible that a high quality image is needed, at the cost of lost high performance. Furthermore, a read memory cycle is always a non-compressed mode cycle. Non-compressed mode access is important if the decompressed data is used by the local workstation for image manipulation. The compressed mode access also allows an increase in performance of the local workstation.

The third problem is that for a high resolution monitor, the serial output of the VRAMs must be interleaved to provide the bandwidth necessary for that monitor. Since current VRAMs have serial output bandwidths of approximately 33 Mhz, a typical frame buffer design has serial output ports interleaved, depending on the attached display. For example, for a monitor resolution of 1280×1024, the video bandwidth is 110 Mhz. Thus, four way VRAM serial output interleaving is sufficient for such resolution. However, for a monitor resolution of 2048×1536, the video bandwidth is 260 Mhz. This requires eight-way interleaving, since four way interleaving only gives 4×33 Mhz, or 132 Mhz, but 8 ways gives 264 Mhz. The frame buffer design and the decompression design should be able to provide flexible video output bandwidth such that the design is not limited to a monitor's resolution.

The prior art shows a variety of VRAM/image buffer schemes for performance improvement. In U.S. Pat. No. 4,410,965, issued Oct. 18, 1983, entitled "Data Decompression Apparatus and Method" to Moore, there is described a hardware decompression mechanism based on Huffman coding of a bit image. The compression method is accomplished by comparing a column or a line to an adjacent one and setting bits accordingly if the comparison matches or does not match. Run length coding is then performed on the resulting data.

In U.S. Pat. No. 4,492,983, issued Jan, 8, 1985 and entitled "System for Decoding Compressed Data" to Yoshida et al., there is described a method of image compression/decompression based on correlation between a pair of adjacent scan lines. The method is used in a facsimile image transmission.

In U.S. Pat. No. 4,626,929, issued Dec. 2, 1986 and entitled "Color Video Signal Recording and Reproducing Apparatus" to Ichinoi et al., there is described a method of color video signal recording and reproducing using a technique in which both luminance and chrominance signals are time-base compressed by the use of random access memory and then are time-division multiplex recorded.

Other patents describing various VRAM and dynamic random access memory video systems can be found in the following U.S. Pat. No. 4,985,871 to Catlin; U.S. Pat. No. 4,951,258 to Uehara; U.S. Pat. No. 4,764,866 to Downey; U.S. Pat. No. 4,698,788 to Flannagan et al.; and U.S. Pat. No. 4,684,942 to Nishi et al.

In accordance with the above, it is an object of this invention to provide an improved image buffer.

It is another object of this invention to provide an improved image buffer that employs minimal input/output pins.

It is still another object of this invention to provide an improved VRAM image buffer that is particularly adapted to handling compressed image data and is able to decompress such image data directly on the semiconductor chip holding the VRAM structure.

SUMMARY OF THE INVENTION

An image buffer semiconductor chip is described that includes circuitry for decompressing, compressed pixel image data such data comprising at least a pair of color codes and a bit mask including bit positions with values that define which pixels in a pixel subset of the pixel image receive the encoded color code data. The chip comprises a matrix of memory modules with the pixels in a pixel subset stored in an interleaved fashion, one pixel per module. A data bus communicates with all of the memory modules and broadcasts the color codes. A mask register stores the bit mask when it appears on the data bus. Circuitry selectively writes a first color code in the modules in accordance with bit values of a first kind in the MASK and writes the second color code into the modules in accordance with bit values of a second kind in the MASK.

DESCRIPTION OF THE DRAWINGS

FIG. 1 is a representation of a 4×4 pixel map and shows how its pixel positions map into a 16 bit mask pattern that is used to identify color allocations thereto.

FIG. 2 shows a compressed data format for an arbitrary 4×4 pixel area, where each pixel is assigned one of two encoded colors.

DETAILED DESCRIPTION OF INVENTION

Figure 3:
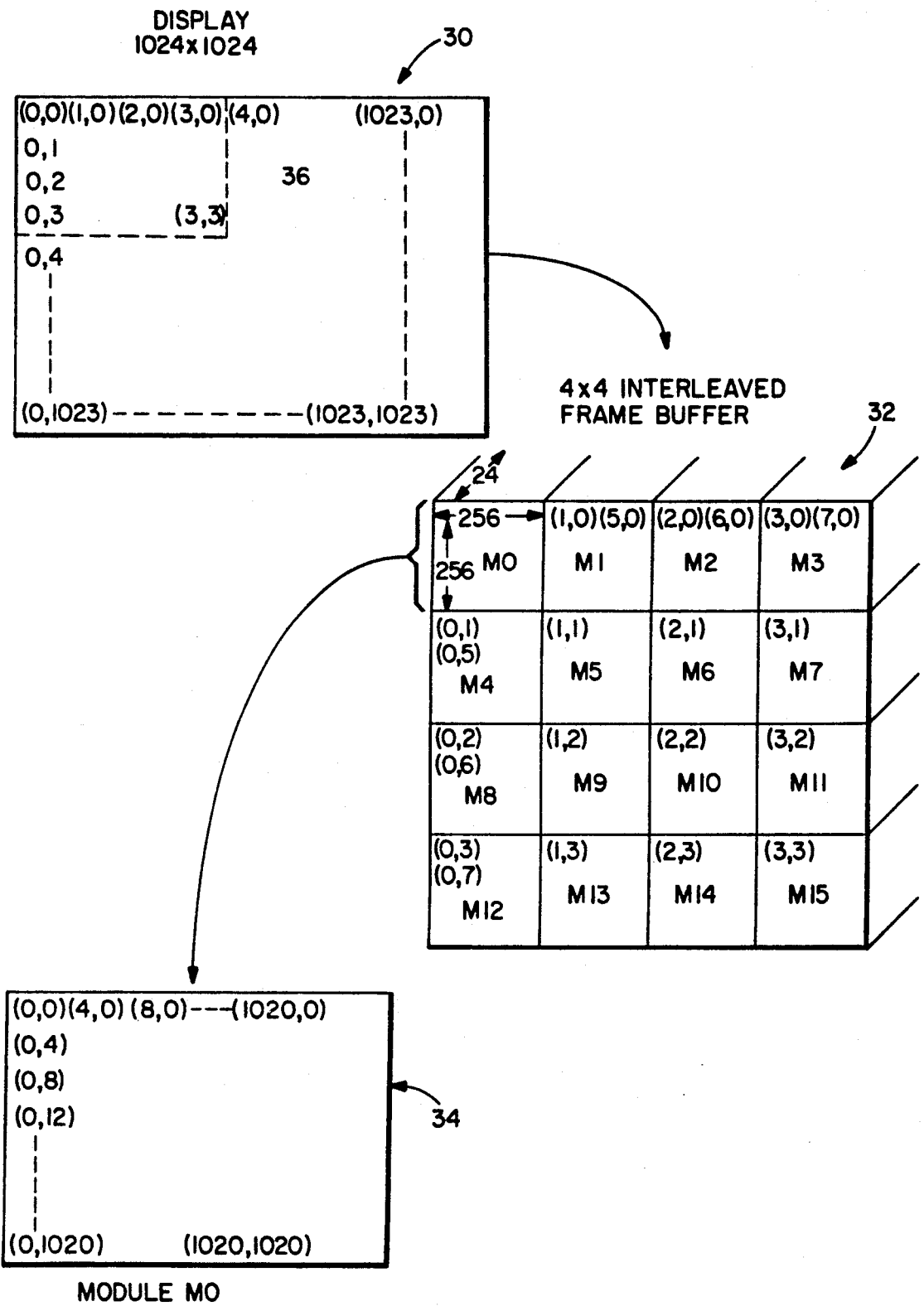
FIG. 3 is a schematic illustrating the relationship of the pixels on a display surface to memory positions in a 4×4 modular frame buffer (and within one module thereof).

Referring now to FIG. 3, the interrelation between a display 30, a 16 memory module frame buffer 32 and an individual frame buffer module 34 will be described. Display 32 is, for example, comprised of 1024×1024 pixels that are displayed in a raster manner. The expanded display subsection 36 shows the upper left-hand corner of display 30 and comprises a 4 pixel×4 pixel subset and indicates the respective addresses of each of the pixels therein. Each pixel address has a column indication followed by a row indication, with the upper left hand pixel having address (0,0), followed by (1,0), (2,0) etc. on row 0. Each pixel is represented by 3 bytes (8 bits each) of color information.

A 4×4 interleaved frame buffer 32 is employed to store the pixel information from display 30 and comprises 16 memory modules M0-M15. Each memory module is 256×256×24 bit positions. Pixel addresses are interleaved into frame buffer 32, both vertically and horizontally, such that each pixel of a 4×4 pixel matrix resides in a different memory module. For example, for the 4×4 matrix 36 shown in display 30, address (0,0) resides in memory module M0; (1,0) in memory module M1; (2,0) in memory module M2, etc. Similarly, pixel address (0,1) resides in memory module M4; (0,2) in memory module M8, etc. At 34, a blow up of module M0 is shown indicating the pixel addresses stored therein. In the known manner, every fourth pixel address can be found therein (both rows and columns).

It can thus be seen, assuming 4×4 subsets of the pixel matrix are operated upon, that memory modules M0-M15 can be operated simultaneously to alter the state of pixel data stored therein. As will become apparent, the interleaving shown in FIG. 3 enables, in combination with the incoming data format, real-time decompression to occur.

To reiterate, data is received in the format shown in FIG. 2, with compressed pixel data being received in two succeeding 32 bit words. A first word includes 24 bits (0:23) indicating a first color (A) and an 8 bit (24:31) HI word mask. The next 32 bit word contains the succeeding color (color B) and an eight bit LO word mask. Together, the LO and HI word masks (hereafter referred to as MASK) map the two colors A and B onto the respective pixel positions.

It will be hereafter assumed that a data processor (not shown) controls the operation of the frame buffer; receives the compressed pixel data and buffers it before providing it to the frame buffer. In the following description, it is further assumed that frame buffer memory 32 is comprised of VRAM memory chips that employ row address strobe (RAS) signals and column address strobe (CAS) signals. As is known to those skilled in the art, those signals are active in the low state and will be indicated as such in this text, when the signal designation is shown as RAS* or CAS*.

The invention provides for substantial improvement in the performance of a video buffer VRAM system through built-in decompression logic and a multiplexed serial output arrangement. The internal bus structure of the VRAM is designed as a 4×4 memory array where a single random I/O port data path connects all 16 memory modules. Decompression is accomplished by broadcasting one encoded color to all memory modules, but actually writing the color data only to a selected address in each memory module that is enabled by a MASK bit. On a subsequent write cycle, a second color is broadcast to the memory modules and those which are not written with the first color data are then written with the second color data. Thus, by the end of a second of two write cycles, 16 pixels in the modules have been updated with two color values.

Since the 16 memory modules are always in a broadcast mode and are "dotted" together, only one random I/O data port is necessary. Thus, assuming a 64 Mbit VRAM that employs a 4×4 memory array of 4 Mbit VRAMs, the total random I/O data port pins required is 16 (as contrasted to 256 for a single 64 Mbit VRAM). The performance of the video buffer is improved by incorporated decompression hardware since as mentioned above, only two write cycles are required for updating of the 16 pixels.

Time multiplexing of the random data I/O port is employed to load MASK bits into the VRAM, followed by color data bits. Thus, no new I/O pins are required for loading the MASK bits so long as the random I/O data port is at least 16 bits wide to accommodate the MASK.

There are two memory accesses for each decompression cycle since each color write requires a memory access. To maximize the throughput of the system, the decompression cycle employs the VRAMs Fast Page Mode cycle. The invention further employs a new memory cycle called Decompressed Page Mode (DPM). DPM makes use of the late write feature of a VRAM.

Figure 4:
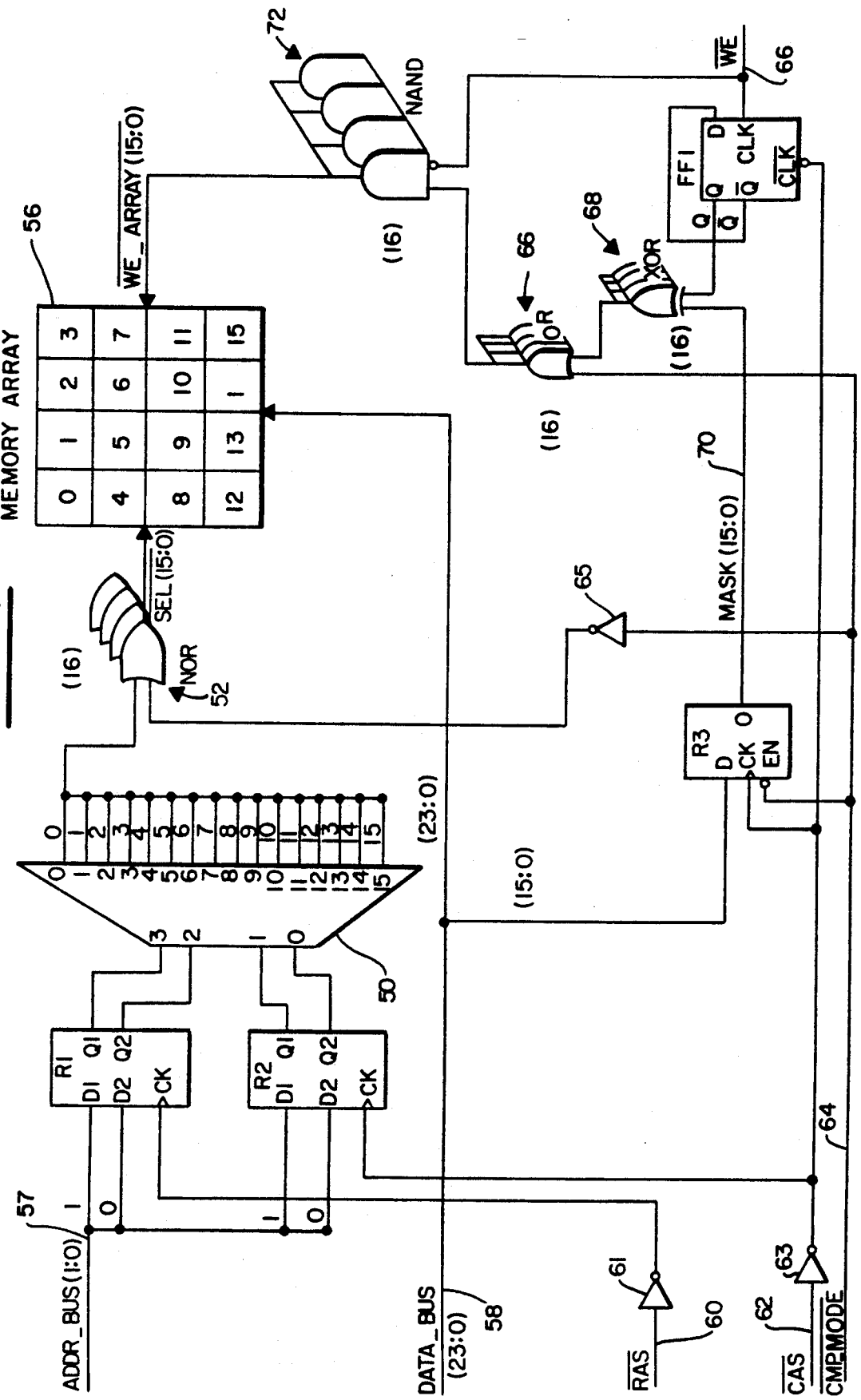
FIG. 4 is a block diagram showing the elements of a frame buffer embodying the invention.

Turning now to FIG. 4, a high level block diagram is shown of a frame buffer configured on a semiconductor chip. Unlike a typical VRAM frame buffer, the VRAM design shown in FIG. 4 includes a 16 bit MASK register R3 which temporarily holds MASK bits used for the decompression actions. Two additional registers, R1 and R2 are used to hold the two least significant bits of row and column addresses respectively. Outputs of registers R1 and R2 are fed into a one-of-16 decoder 50.

Registers R1 and R2 and decoder 50 are used for a single pixel access memory operation. Inputs to registers R1 and R2 are derived from low order address bus 57 which holds the two least significant bits of row and column addresses, respectively. These address bits, as will be explained below, select one of four rows (in a 4×4 array) and one of four columns to enable an individual memory element to be addressed when the memory array is operating in a normal (non-decompression) mode.

The 16 outputs from decoder 50 are fed into 16 NOR gates 52, each of whose outputs, when active, invokes a select signal SEL* that enables access to a specific associated one of the memory modules in memory array 56. Memory array 56 is arranged as a 4×4 matrix of memory modules 0-15. Addresses within memory array 56 and modules 0-15 are arranged as shown in FIG. 3. Furthermore, each module within the memory array 56 has its own write enable (WE ARRAY*) signal. Thus, using SEL* and WE ARRAY* signals, all memory operations can be accomplished. All modules in memory array 56 share all other signals including frame buffer address, RAS* and CAS*.

Additional inputs to the image buffer are applied via a 24 bit data bus 58; a RAS* conditioning line 60; a CAS* conditioning line 62; a CMP MODE* conditioning line 64 and a WE* (write enable) conditioning line 66. Data bus 58 comprises 24 lines capable of carrying three, 8 bit bytes of RGB color data to memory array 56 and a 16 bit MASK to register R3. The color and MASK data signals are time multiplexed onto bus 58 by the controlling computer (not shown).

A RAS* signal applied to line 60 passes through inverter 61 and is applied to register R1. A CAS* signal applied to line 62 is also inverted by inverter 63 and is applied to register R2, register R3, and flip flop FF1 (as a "clear" signal). A CMP MODE* signal is applied via line 64, is inverted by inverter 65, and is applied to the 16 NOR gates 52. The CMP MODE* signal is also applied to a set of 16 OR gates 66. Flip flop FF1 has a pair of outputs Q and Q*, with the Q output being applied, in parallel, to 16 XOR (exclusive-or) circuits 68. The second input to each of XOR circuits 68 is derived from an individual output from register R3 (via MASK bus 70). The outputs from XOR circuits 68 are fed via a set of 16 OR gates 66 to a set of 16 NAND gates 72, each of which also has an inverted write enable (WE*) signal as a controlling input.

Before describing the operation of the display buffer in the decompress mode (DPM), its operation will be described in the single access memory mode. As aforestated, the two least significant row address bits select one of four rows of a 4×4 pixel array and the two least significant column address bits select one of the four columns of the 4×4 pixel array. Registers R1 and R2 are enabled when both CAS and RAS signals are applied, at which point they provide the stored address bits to decoder 50 which, in turn, activates one of its 16 output lines. As CMP MODE* has not been asserted, the single line from decoder 50 causes the respectively connected NOR gate 52 to assert a Select (SEL*) line that enables one of the modules in memory array 56. Subsequently, that module is addressed in the normal manner (the address bus, RAS* and CAS* lines are not shown).

Figure 5:
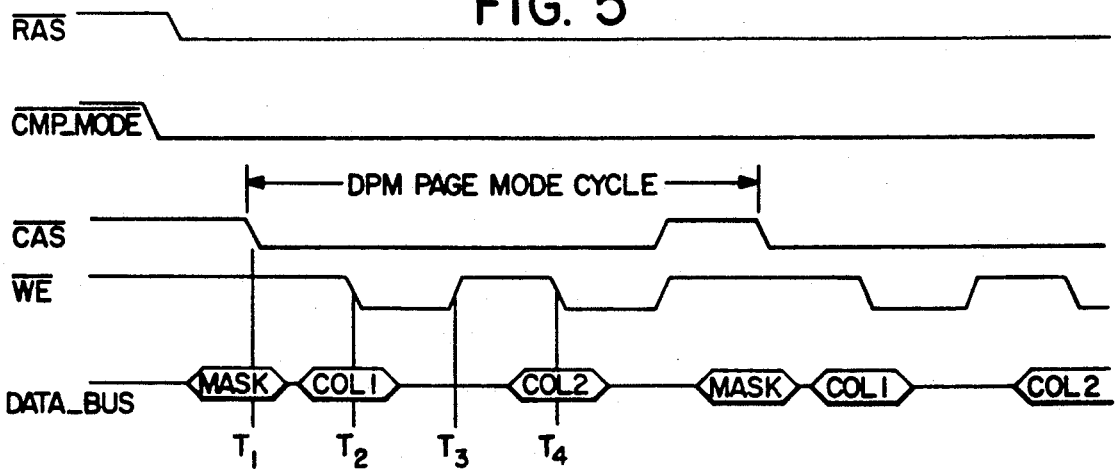
FIG. 5 illustrates a modified VRAM memory cycle employed by the invention.

The compress mode cycle will now be described in conjunction with the waveform diagrams of FIG. 5. During a compress mode cycle, compress mode signal (CMP MODE*) is asserted and forces all 16 NOR gates 52 to further assert their respect SEL* output lines. Thus, all 16 memory modules are enabled for a write operation. Once CMP MODE* is asserted and the CAS* signal becomes active (i.e. falls to a low level at t1, FIG. 5), MASK data is driven onto data bus 58 (from the external computer) and into MASK register R3. The 16 MASK bits are stored in register R3 until another compress mode cycle is initiated.

The fall of CAS* on line 62 is inverted by inverter 63 and is applied as a reset to flip flop FF1, which initializes its Q output to the zero state. At that point, MASK bits on bus 70 exhibiting a high level cause their respectively connected XOR circuits 68 to provide high levels through the respectively connected OR gates 66 to connected NAND circuits 72. However, since the write enable signal (WE*) on line 66 has not yet been asserted, nothing further happens at this time.

The first color data is driven onto data bus 58 (from the controlling computer) at the same time the first write enable (WE*) is strobed (t2). As a result, all WE ARRAY* lines from NAND circuits 72, with their corresponding mask bits equal to one, are strobed and write the first color data (on data bus 58) into the memory elements of the 4×4 matrix that correspond to the one level mask bits.

The positive going end of the first WE* strobe (at t3) causes flip flop FF1 to set its Q output to the high state. The high state Q level forces the outputs of XOR's 68 to reflect the inverse of the MASK bit levels. On a subsequent WE* strobe at t4, all of the memory elements that have the corresponding mask bits equal to 0 are loaded with the color data on data bus 58. Once the color encoded data has been loaded into the pixel positions in memory array 56, a new MASK is clocked onto data bus 58 and enables a new encoded color to be loaded, etc.

Figure 6:
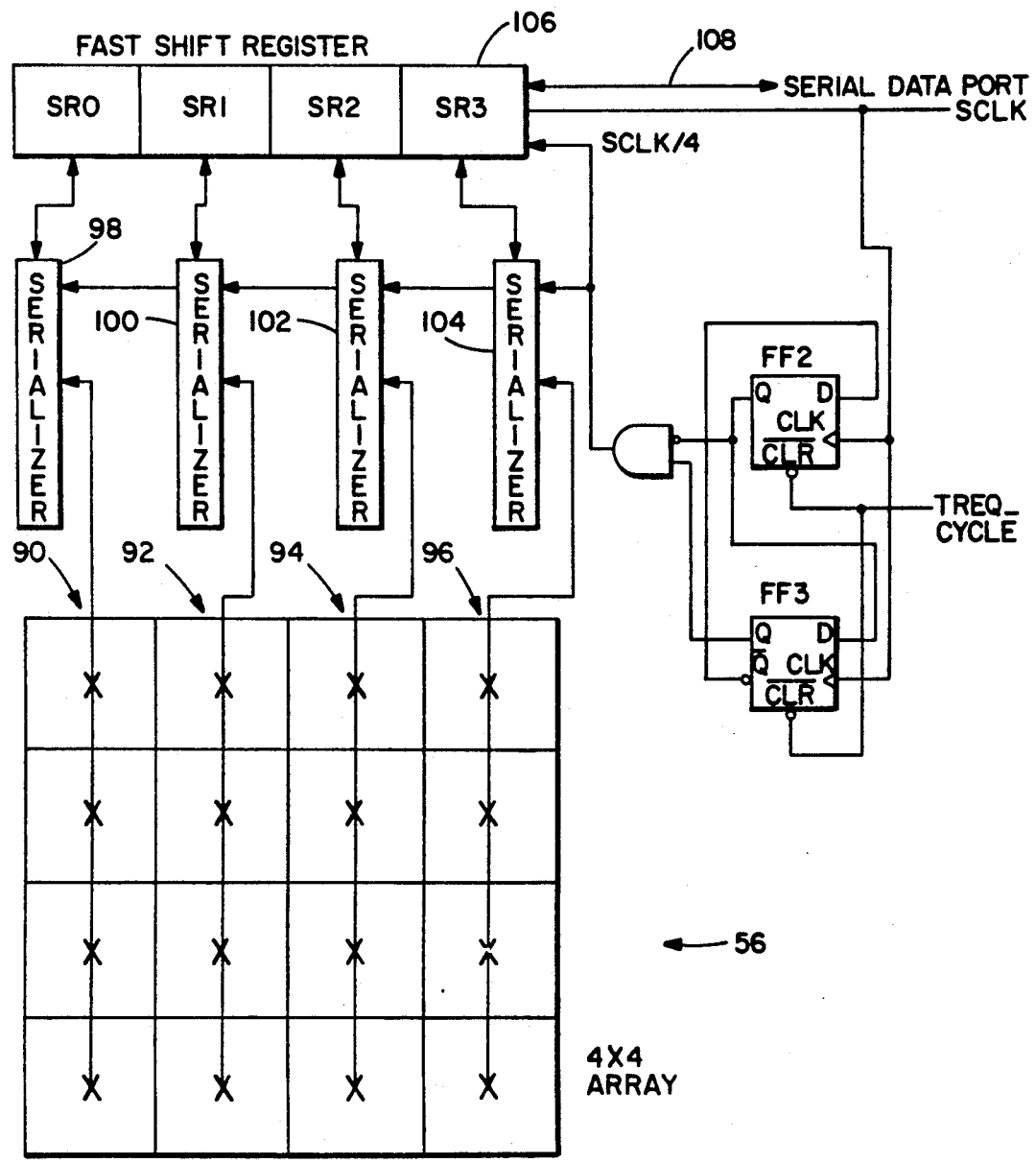
FIG. 6 is a block diagram of circuitry for providing serial outputs from the frame buffer incorporating the invention.

As mentioned above, available VRAM serial output ports have an insufficient bandwidth to support a high resolution display. However, the chip architecture employed herein enables significant output bandwidth improvement without the need for output pin multiplication. In FIG. 6, each of four columns 90, 92, 94, 96 of memory array 56 is dotted to a serializer 98, 100, 102, 104 (i.e., a shift register). The "dot" connection can be used due to the interleaving of pixels within array 56. Because of the interleaving, no two rows are read-out at the same time.

The serializers are stepped by a clock signal (SCLK/4) which is 4 times slower than SCLK. For a serial port read cycle, on every fourth SCLK, SCLK/4 is generated and shifts each of serializers 98, 100, 102 and 104. In addition, the outputs from the serializers are parallel-loaded into four stages (SR0-SR3) of a fast shift register 106. The loading occurs under the control of SCLK/4, but the read out from fast shift register 106 is controlled by SCLK, thereby causing data to appear on serial data port 108 at the full SCLK rate.

Fast shift register 106 is a small, fast 4 bit shift register, twenty-four of which are provided for the memory modules (assuming 24 bit pixel color data). A shift register 106 can be constructed of sub-micron CMOS technology which can provide a 12 mA I/O buffer with propagation delays less than 2 nS with 50 pF load and a flip-flop which has less than 1.5 nanoseconds clock to output propagation delay. The SCLK/4 clock signals are derived from a pair of flip flops FF2, FF3 which are, in turn, reset by the TREQ cycle enable input.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An image buffer semiconductor chip for receiving compressed image pixel data for a matrix of pixels in the form of at least a pair of color codes and a mask whose bit positions define which pixels in the matrix receive said color codes, said chip operating to decompress the received compressed image pixel data, said chip comprising:

represented by a first color code, a second color code, and a mask, the integrated circuit memory device including an n row by m column array of memory storage modules having n×m (n times m) memory storage modules, comprising the steps of:

applying a row address to the integrated circuit memory device;

asserting a row address strobe signal line for addressing a row of memory storage locations within each of said n×m memory storage modules;

applying a column address to the integrated circuit memory device;

applying a n×m-bit mask to the integrated circuit memory device;

asserting a column address strobe signal line for addressing a column of memory storage locations within each of said n×m memory storage modules, the assertion of the column address strobe signal line also storing the n×m-bit mask within a mask register within the integrated circuit memory device;

applying first color code data to the integrated circuit memory device;

asserting and then deasserting a write enable signal for causing the first color code data to be stored at the addressed row and column within individual ones, if any, of memory storage modules that are specified by the n×m-bit mask that is stored in the mask register;

applying second color code data to the integrated circuit memory device; and asserting and then deasserting the write enable signal for causing the second color code data to be stored at the addressed row and column within individual ones, if any, of the memory storage modules that are specified by an inverse of the n×m-bit mask that is stored in the mask register.

* * * * *